US006965182B2

(12) United States Patent
Jeong et al.

(10) Patent No.: US 6,965,182 B2
(45) Date of Patent: Nov. 15, 2005

(54) POLE-CHANGE TYPE MOTOR

(75) Inventors: Seung-Kiu Jeong, Kimhae-shi (KR); Moon-Kyoung Son, Busankwangyeok-shi (KR); Tae-Uk Jung, Masan-shi (KR)

(73) Assignee: LG Electronics Inc., Seoul (KR)

( * ) Notice: Subject to any disclaimer, the term of this patent is extended or adjusted under 35 U.S.C. 154(b) by 56 days.

(21) Appl. No.: 10/380,672

(22) PCT Filed: Sep. 10, 2001

(86) PCT No.: PCT/KR01/01526

§ 371 (c)(1),
(2), (4) Date: Mar. 18, 2003

(87) PCT Pub. No.: WO02/23710

PCT Pub. Date: Mar. 21, 2002

(65) Prior Publication Data

US 2004/0021389 A1    Feb. 5, 2004

(30) Foreign Application Priority Data

Sep. 18, 2000 (KR) ............................ 2000-54668

(51) Int. Cl.[7] .............................................. H02K 3/00
(52) U.S. Cl. ............... 310/180; 310/179; 310/180; 310/184; 310/198; 318/542; 318/341
(58) Field of Search .......................... 310/180, 179, 310/183, 184, 198; 318/542, 361

(56) References Cited

U.S. PATENT DOCUMENTS 4,263,540 A * 4/1981 Brandt et al. ............... 310/198
4,296,344 A * 10/1981 Rabe ........................... 310/184
4,473,788 A * 9/1984 Kirschbaum ................ 320/180
4,822,331 A * 4/1989 Taylor .......................... 494/16
5,760,567 A * 6/1998 Nakamura ................... 310/184
6,175,209 B1 * 1/2001 Fei ............................... 318/776
6,255,755 B1 * 7/2001 Fei ............................... 310/184
6,703,747 B2 * 3/2004 Kawamura .................. 310/179
6,707,214 B1 * 3/2004 Fwe ............................. 310/184

FOREIGN PATENT DOCUMENTS

JP          580265557          2/1983

(Continued)

Primary Examiner—Darren Schuberg
Assistant Examiner—Iraj A. Mohandesi
(74) Attorney, Agent, or Firm—McKenna Long & Aldridge LLP

(57) ABSTRACT

Disclosed is a pole-change type motor that provides a variable-speed (two-pole or four-pole type) operation system capable of reducing the load of the motor of the normal operation system and improving the cooling efficiency. In case of a quick operation, the motor switches over to the two-pole type according to the control of a relay section. At this time, the load of the motor is reduced by offsetting an abnormal magnetic field distribution formed due to the same polarity of adjacent main windings using compensation windings of an opposite polarity. If the quick operation is needed, the motor switches over to the two-pole type, and operates at a high speed to achieve the quick cooling. Then, if a standard operation is possible with the lapse of the predetermined time, the motor switches over to the four-pole type, and operates at a low speed to achieve an effective cooling.

25 Claims, 6 Drawing Sheets

FOREIGN PATENT DOCUMENTS

| | | |
|---|---|---|
| JP | 58046855 | 3/1983 |
| JP | 59092751 | 5/1984 |
| KR | 93-024266 | 12/1993 |
| KR | 0159617 B1 | 8/1998 |

* cited by examiner during two-pole operation during two-pole operation during four-pole operation during four-pole operation

POLE-CHANGE TYPE MOTOR

TECHNICAL FIELD

The present invention relates to a motor for a compressor, and more particularly to a pole-change type motor.

BACKGROUND ART

Generally, a compressor is a device that compresses refrigerant using a rotating force of an internal motor, and is used in a refrigerator, air conditioner, etc.

Especially, as shown in FIG. 1, a motor for a compressor applied in a refrigerator is composed of a stator and a rotor, and can perform only a normal operation (for example, rotation of 3600 rpm) though there is a difference according to the characteristic of the product.

Meanwhile, the representative operation mode of the refrigerator is classified into a quick operation mode and a standard operation mode. Actually, the time when the refrigerator operates in the quick operation mode is less than 10% of the real use time of the refrigerator, and during other time, the refrigerator operates in the standard operation mode.

Conventionally, in the standard operation mode, the temperature width to be adjusted is not so large. However, in the quick operation mode, the temperature width to be adjusted is large, and thus a quick cooling is performed by driving the motor at a fixed speed, i.e., at a high speed. This high-speed operation exerts a bad effect on the refrigerator such as generation of noise, increase of power consumption, strain on the product, etc.

Nevertheless, the compressor motor of the refrigerator, irrespective of the operation mode, operates at a high speed to match the quick cooling mode.

As shown in FIG. 2, the conventional compressor motor is driven at a single speed. That is, in case of the quick operation mode, the duty rate of the motor is set as '1', and the compressor motor is continuously driven irrespective of the temperature condition of the refrigerator.

In case of the standard operation mode, the compressor motor is driven to repeat an on/off operation according to a proper duty rate so that the refrigerator maintains its set temperature according to the temperature condition of the refrigerator. At this time, the load of the motor in the quick operation mode is greater than that in the standard operation mode.

As described above, since the conventional motor for the compressor is driven at the high speed irrespective of the operation mode, it has a large power consumption, and generates much noise during operation. Also, the product may be damaged due to the frequent on/off operation of the motor, and this causes the life span of the product to be shortened.

DISCLOSURE OF THE INVENTION

Therefore, an object of the present invention is to solve the problems involved in the prior art and to provide a pole-change type motor that can vary the speed of the motor to provide a variable-speed operation system.

In order to accomplish the above-mentioned object, the present invention provides a pole-change type motor comprising a rotor, a stator for generating a torque of the rotor so as to perform a high-speed or low-speed operation through a pole change, and a relay section for controlling the pole change of the stator.

BRIEF DESCRIPTION OF THE DRAWINGS

The above object, other features and advantages of the present invention will become more apparent by describing the preferred embodiment thereof with reference to the accompanying drawings, in which.

BEST MODE FOR CARRYING OUT THE INVENTION

Now, the pole-change type motor according to a preferred embodiment of the present invention will be described in detail with reference to the annexed drawings.

Figure 1:
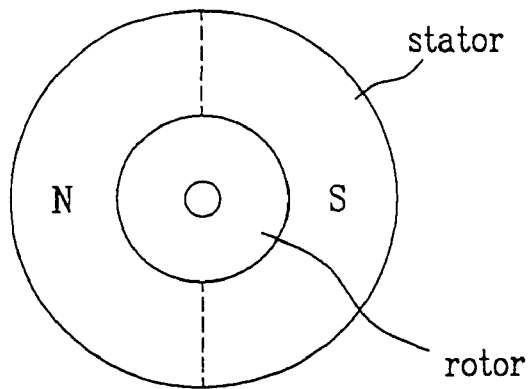
FIG. 1 is a view illustrating a conventional motor for a compressor.
Figure 2:
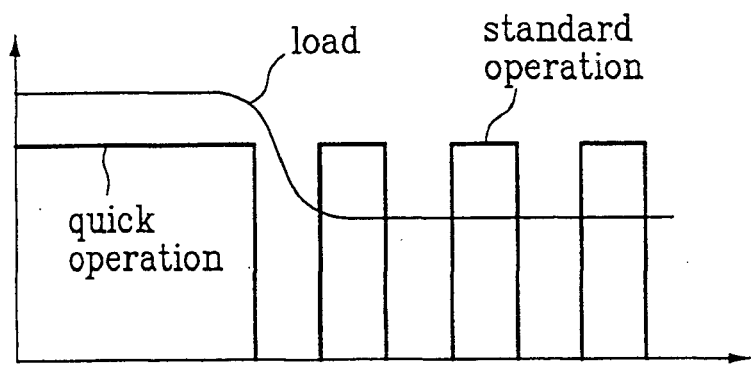
FIG. 2 is a graph illustrating an operation state of a conventional motor for a compressor.
Figure 3:
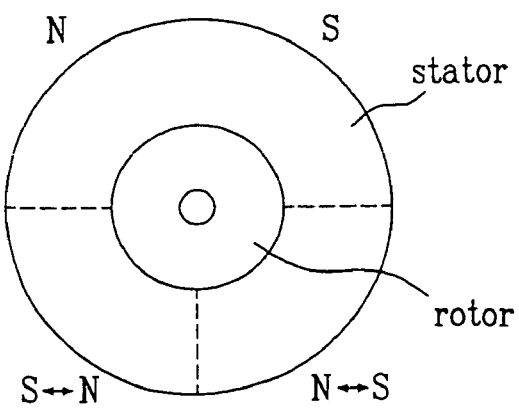
FIG. 3 is a view illustrating a pole-change type motor for a compressor according to the present invention.
Figure 4:
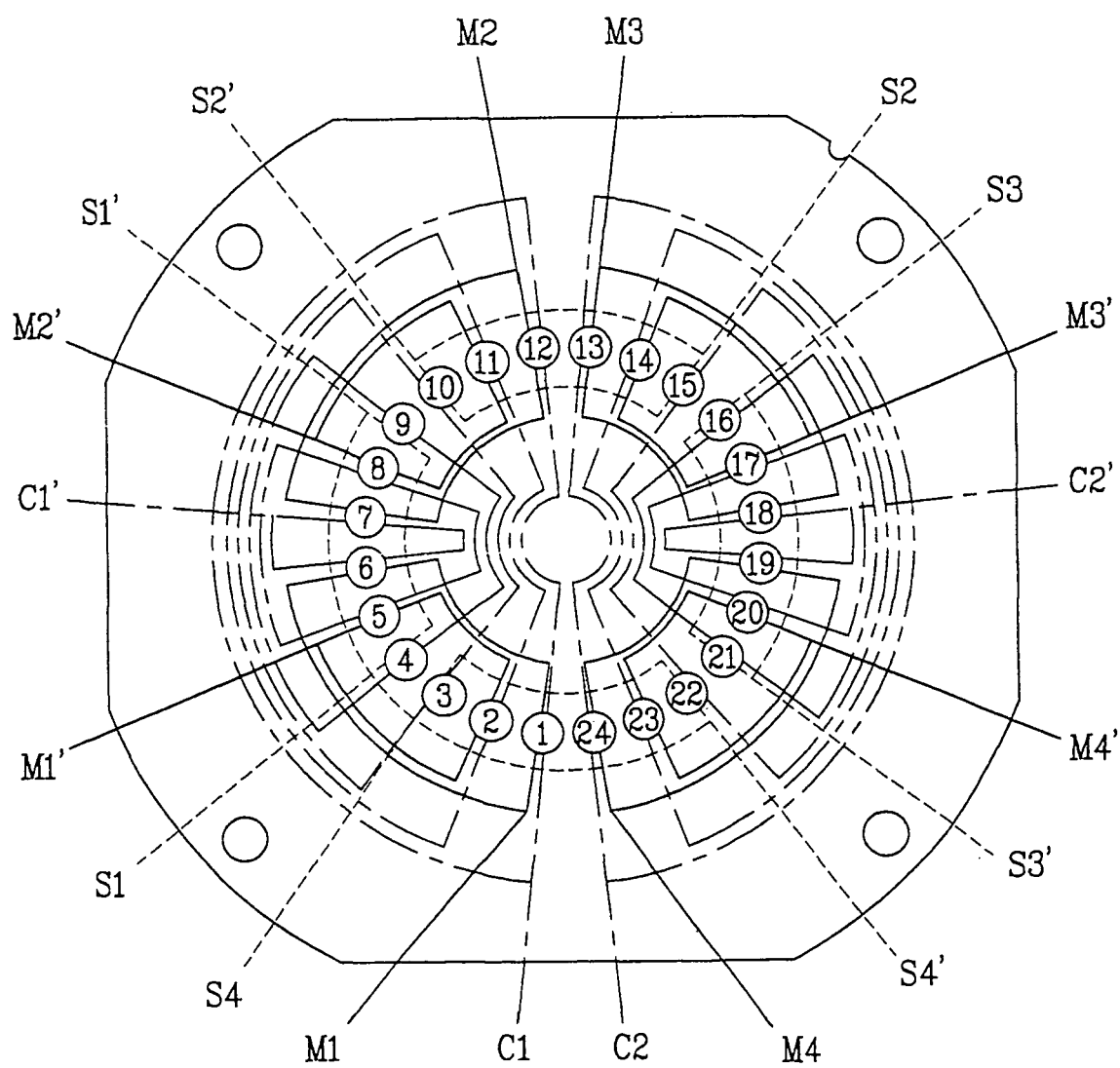
FIG. 4 is a view illustrating the structure and winding arrangement of a pole-change type motor according to the present invention.
Figure 5:
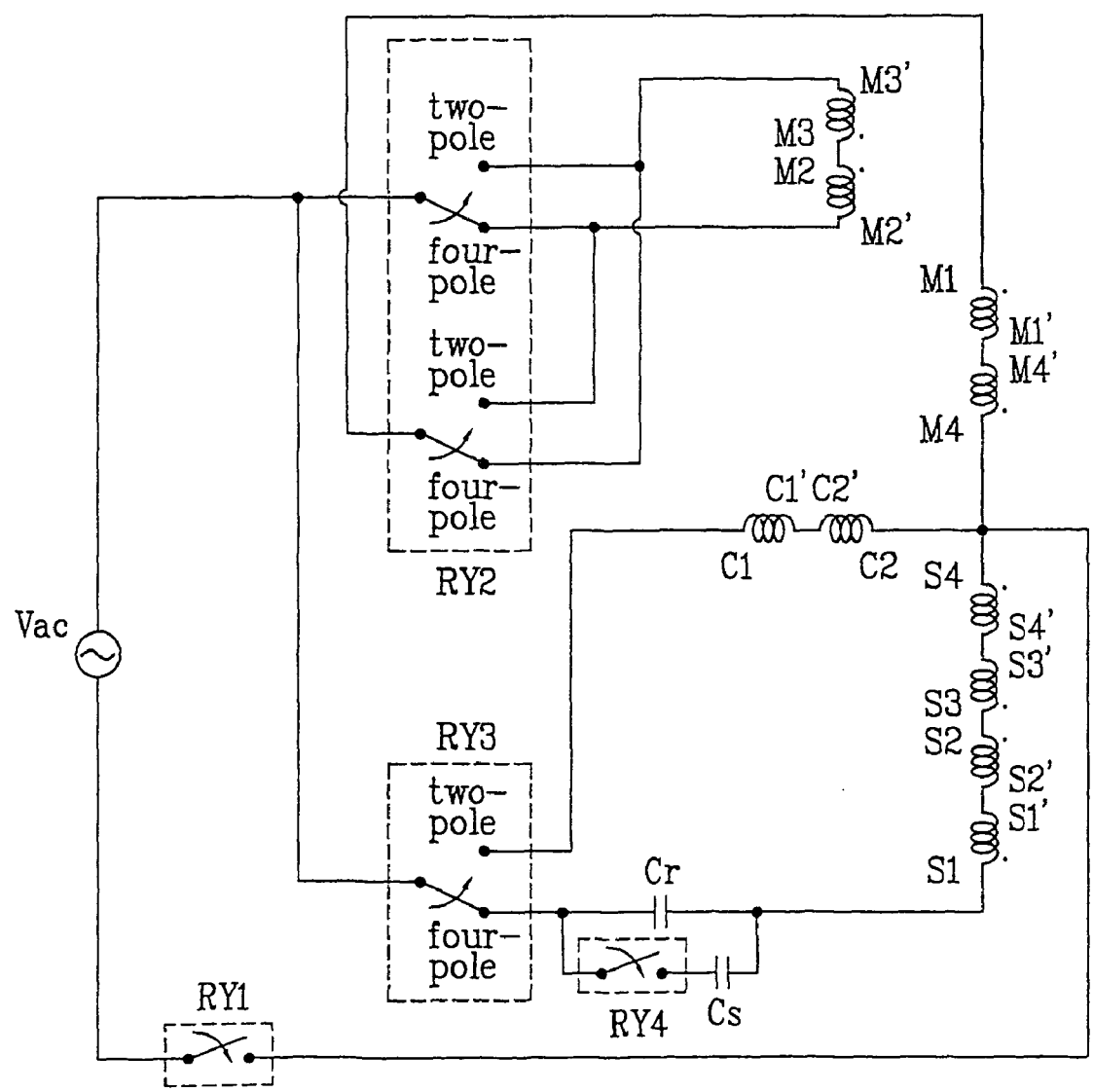
FIG. 5 is a circuit diagram of a control section of a pole-change type motor according to the present invention.

FIG. 3 is a view illustrating a pole-change type motor for a compressor according to the present invention, FIG. 4 is a view illustrating the structure and winding arrangement of a pole-change type motor according to the present invention, and FIG. 5 is a circuit diagram of a control section of a pole-change type motor according to the present invention.

Figure 6:
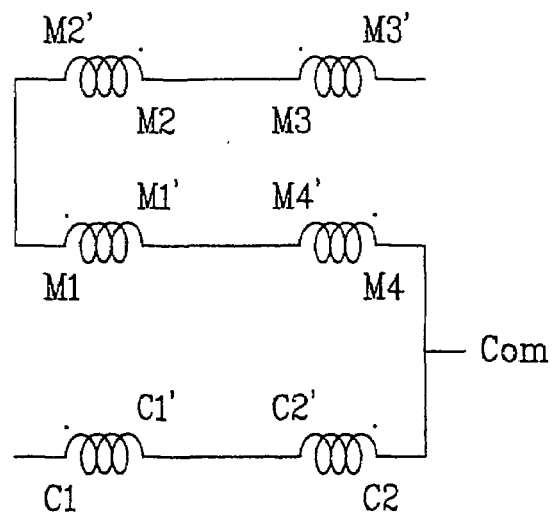
FIG. 6 is a view illustrating a wiring state of a two-pole operation of the motor according to the present invention.
Figure 7:
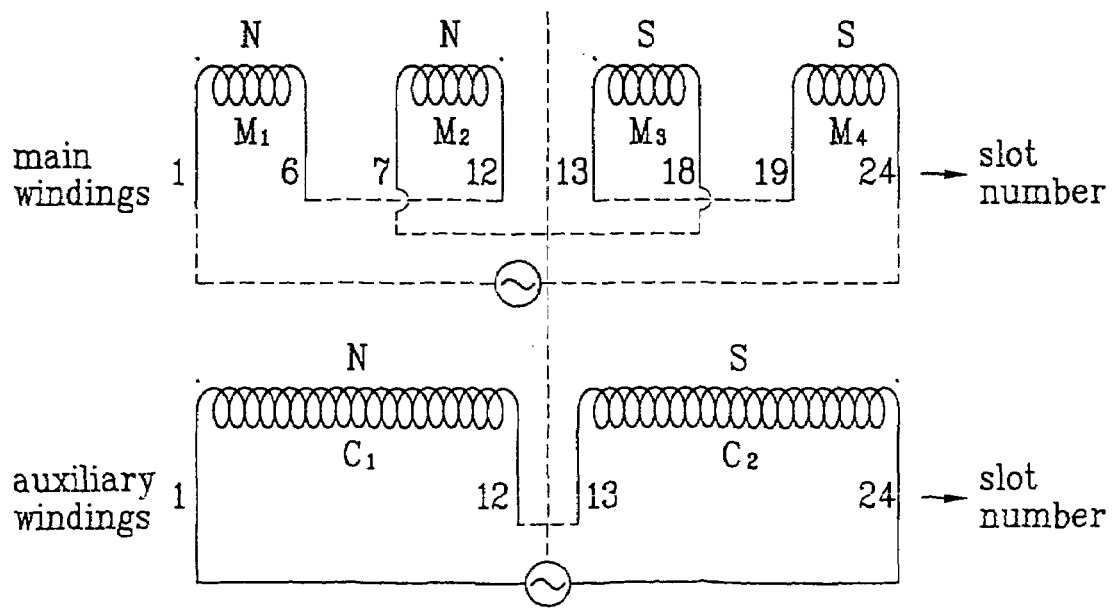
FIG. 7 is a view illustrating a magnet field distribution of a two-pole operation of the motor according to the present invention.
Figure 8:
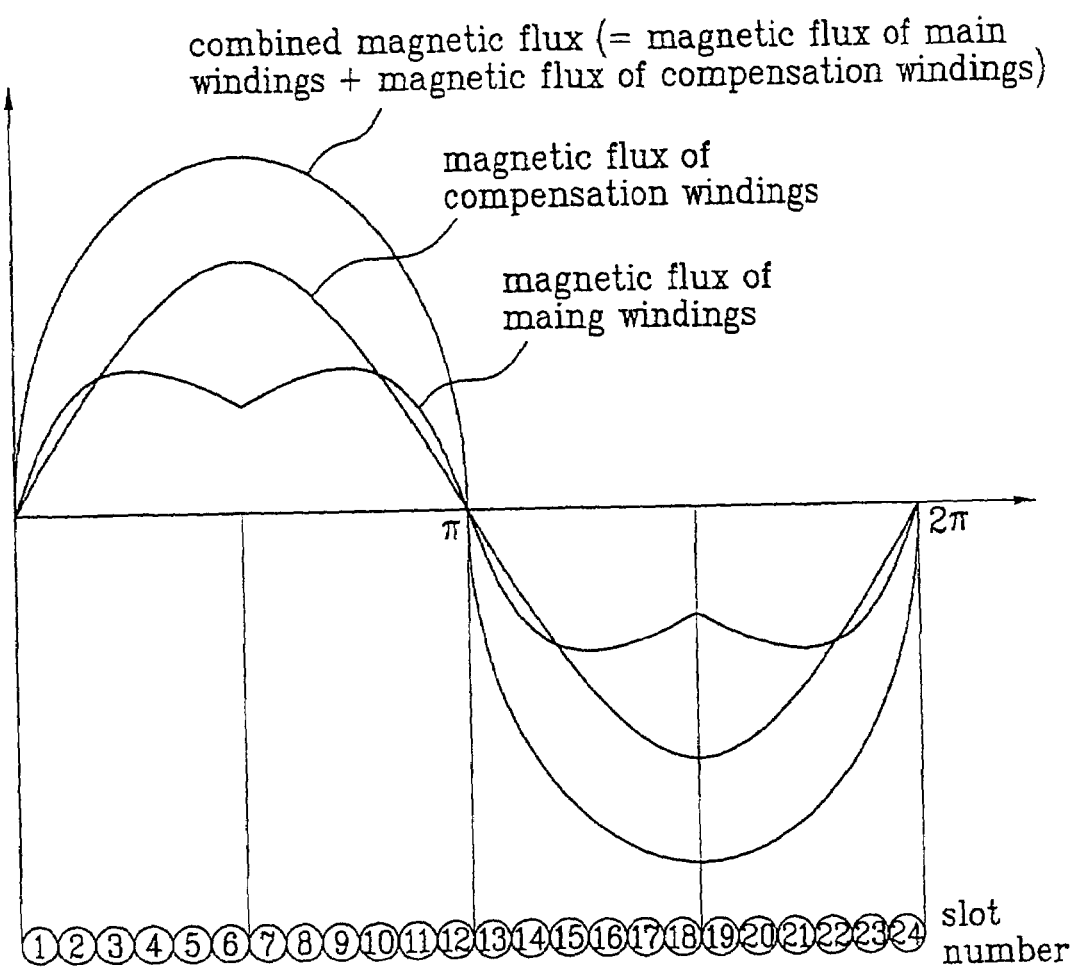
FIG. 8 is a graph illustrating an abnormal magnetic field distribution of a main winding and compensation for an abnormal magnetic field distribution effected by compensation windings according to the present invention.

Also, FIG. 6 is a view illustrating a wiring state of a two-pole operation of the motor according to the present invention, FIG. 7 is a view illustrating a magnet field distribution of a two-pole operation of the motor according to the present invention, and FIG. 8 is a graph illustrating an abnormal magnetic field distribution of a main winding and compensation for an abnormal magnetic field distribution effected by compensation windings according to the present invention.

Figure 9:
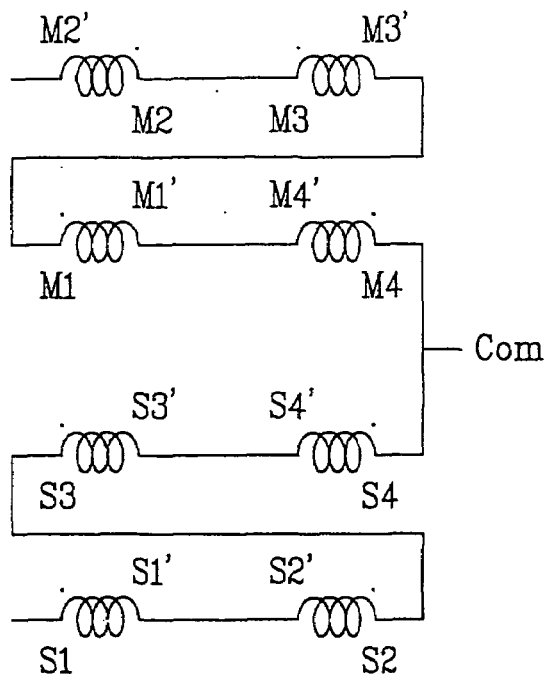
FIG. 9 is a view illustrating a wiring state of a four-pole operation of the motor according to the present invention.
Figure 10:
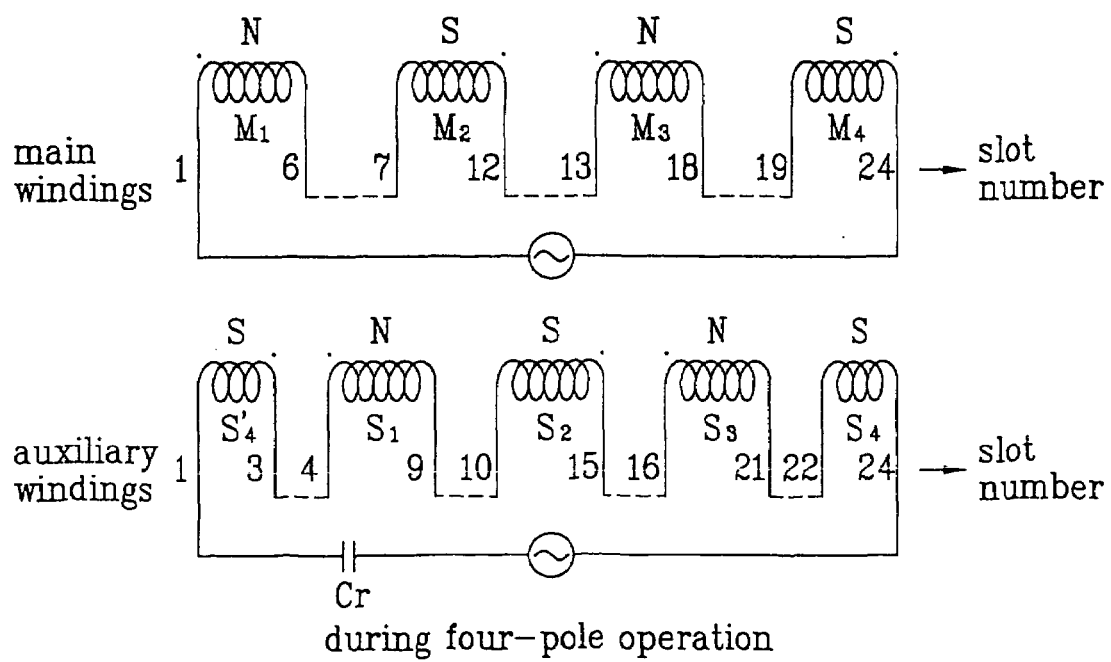
FIG. 10 is a view illustrating a magnet field distribution of a four-pole operation of the motor according to the present invention.

Also, FIG. 9 is a view illustrating a wiring state of a four-pole operation of the motor according to the present invention, and FIG. 10 is a view illustrating a magnet field distribution of a four-pole operation of the motor according to the present invention.

As shown in FIG. 3, the pole-change type motor according to the present invention includes a rotor (reference numeral omitted), a stator (reference numeral omitted) for generating a torque of the rotor so as to perform a high-speed or low-speed operation through a pole change (i.e., from the two-pole type to the four-pole type and vice versa), and a relay section (not illustrated) for controlling the pole change of the stator.

The stator, as shown in FIG. 4, includes first to fourth main windings M1~M4 for generating the torque of the rotor by two poles or four poles, first to fourth auxiliary windings S1~S4 for generating a start torque and a rotative torque by supplying a magnetic flux orthogonal to a magnetic flux generated by the first to fourth main windings M1~M4, and first and second compensation windings C1 and C2 for compensating for a magnetic flux distortion generated between the same poles of the first to fourth main windings M1~M4 during a two-pole operation.

Also, in order to variably adjust the speed of the motor at a low or high speed, the relay section changes polarities of the first to fourth main windings M1~M4 and the first to fourth auxiliary windings S1~S4 to the two poles or four poles, and switches the connection state of the first and second compensation windings C1 and C2.

At this time, the relay section includes a first relay section RY1 for switching to control the on/off operation of the motor, a second relay section RY2 for switching to change the polarity by changing wiring of the first to fourth main windings M1~M4, a third relay section RY3 for switching to change the polarity by changing wiring of the first to fourth auxiliary windings S1~S4, and first and second compensation windings C1 and C2, and a fourth relay section RY4 for switching to change wiring of capacitors during the four-pole operation according to the switching of the third relay section RY3.

According to the present invention, the relay section operates in association with a temperature sensor, and if the quick operation is required according to a result of temperature sensing, the relay section controls all the relay sections to switch over to the two-pole termination so that the motor operates with the two poles.

On the contrary, if the load is reduced due to the two-pole operation and thus the quick operation is not required, the relay section controls the relay sections to switch over to the four-pole termination so that the motor operates with the four poles.

The operation of the pole-change type motor according to the present invention as constructed above will now be explained.

First, the operation of the motor in the quick operation mode is as follows.

Referring to FIG. 5, the first relay section RY1 is turned on, and the second and the third relay sections RY2 and RY3 switch over to the two-pole termination, respectively. At this time, if the third relay section RY3 switches over to the two-pole termination, the power is supplied to the first and second compensation windings C1 and C2, which are connected between the adjacent windings of the same polarity among the first to fourth main windings M1~M4.

During the two-pole operation, the wiring state of the first to fourth main windings M1~M4 and the first and second compensation windings C1 and C2 is illustrated in FIG. 6.

In this state, the rotor starts to rotate by the start torque of the first to fourth main windings M1~M4 generated by the power supply, and the motor is driven by the first to fourth main windings M1~M4 and the first and second compensation windings C1 and C2 at a high speed with the two poles.

At this time, the windings adjacent to each other among the first to fourth main windings M1~M4 have the same polarity. For example, the first and second main windings M1 and M2 have the N pole, and the third and fourth main windings M3 and M4 have the S pole. FIG. 7 shows the magnetic field distribution during the two-pole operation.

Because of the above-described magnetic field distribution, there occurs an abnormal phenomenon of a space magnetic flux distribution that the S pole is compulsorily created between the first and second main windings M1 and M2. In this case, since the first compensation windings C1 adjacent to the first and second windings M1 and M2 has the N pole, the S pole component of the first and second main windings M1 and M2 is offset to compensate for the abnormal phenomenon of the space magnetic flux distribution.

In the same manner, an abnormal phenomenon of a space magnetic flux distribution generated between the third and fourth main windings M3 and M4 is compensated for by the polarity of the second compensation winding C2.

With reference to the graph of FIG. 8, the abnormal phenomenon of the space magnetic flux distribution generated between the first and second main windings M1 and M2 or between the third and fourth main windings M3 and M4 during the two-pole operation, i.e., a distortion phenomenon that the magnetic flux is rapidly reduced between sixth and seventh slots or between 18th and 19th slots.

Accordingly, in order to compensate for the abnormal sine-wave magnetic flux due to the distortion phenomenon, the magnetic flux of the first to fourth main windings M1~M4 and the magnetic flux of the first and second compensation windings C1 and C2 are combined to produce a combined sine-wave magnetic flux, and this causes the efficiency and noise characteristics to be improved.

Here, the first and second compensation windings C1 and C2 are connected in parallel to the first to fourth main windings M1~M4 in case that the output torque is large, while they are connected in series to the first to fourth main windings M1~M4 in case that the output torque is small.

During the quick operation, i.e., the two-pole operation, if it is detected that the quick operation is not required through the temperature sensing by the temperature sensor, the quick operation should switch over to the standard operation.

Here, the operation of the motor in the standard operation mode is as follows.

Referring to FIG. 5, the first relay section RY1 is turned on, and the second and the third relay sections RY2 and RY3 switch over to the four-pole termination, respectively.

At this time, if the third relay section RY3 switches over to the four-pole termination, the power is supplied to the first to fourth auxiliary windings S1~S4, and the connection between the first and second compensation windings C1 and C2 and the first to fourth main windings M1~M4 is released.

During the four-pole operation, the wiring state of the first to fourth main windings M1~M4 and the first to fourth auxiliary windings S1~S4 is illustrated in FIG. 6.

In this state, the rotor starts to rotate by the start torque of the first to fourth main windings M1~M4 generated by the power supply, and the motor is driven by the first to fourth main windings M1~M4 and the first to fourth auxiliary windings S1~S4 at a low speed with the four poles.

At this time, as shown in FIG. 10, the mechanical position of the first to fourth auxiliary windings S1~S4 is displaced by 90° and the phase thereof is shifted by 90° with respect to the first to fourth main windings M1~M4 to form the four poles.

Also, during the four-pole operation of the motor, the windings adjacent to each other among the first to fourth main windings M1~M4 have the polarity opposite to each other. For example, as shown in FIG. 10, the first and third main windings M1 and M3 have the N pole, and the second and fourth main windings M2 and M4 have the S pole, so that the abnormal phenomenon of the space magnetic flux distribution does not occur between the main windings.

Accordingly, during the standard operation where the motor operates by four poles, the connection of the first and second compensation windings C1 and C2 is released.

Also, according to the present invention, the connection and release of a starting capacitor Cs connected to the first auxiliary windings S1 is controlled through the fourth relay section RY4.

Specifically, in order to increase the start torque of the rotor for a predetermined time through the fourth relay section RY4, the starting capacitor Cs is connected in parallel to the operation capacitor Cr, and if the predetermined time elapses, the fourth relay section RY4 is turned off.

At this time, while the specified wiring form of the first to fourth main windings M1~M4 and the first and second compensation windings C1 and C2, and of the first to fourth main windings M1~M4 and the first to fourth auxiliary windings S1~S4 have been described and illustrated with reference to the preferred embodiment of the present invention, it will be apparent that various changes in form and details may be made therein as needed in circuit design.

INDUSTRIAL APPLICABILITY

As apparent from the above description, the pole-change type motor according to the present invention has the effects that if the quick operation is needed, the motor switches over to the two-pole type and operates at the high speed to achieve the quick cooling, while if the standard operation becomes possible with the lapse of the predetermined time, the motor switches over to the four-pole type and operates at the low speed to achieve an effective cooling.

What is claimed is:
1. A pole-change type motor comprising:
  a rotor;
  a stator for generating a torque of the rotor so as to perform a high-speed or low-speed operation of the motor through a pole change; and
  a relay section for controlling the pole change of the stator according to a load on the motor, the relay section comprising:
    a first relay section for switching to control an on/off operation of the motor;
    a second relay section for switching to change the pole of the stator from a two-pole type to a four-pole type and vice versa by changing wiring of the first and fourth main windings;
    a third relay section for switching to change a polarity by changing wiring of the first to fourth auxiliary windings, and the first and second compensation windings; and
    a fourth relay section for switching to control a start torque during a four-pole operation according to the switching operation of the third relay section.
2. The pole-change type motor of claim 1, wherein the stator comprises:
  first to fourth main windings for generating the torque of the rotor by two poles or four poles;
  first to fourth auxiliary windings for generating a start torque and a rotative torque by supplying a magnetic flux orthogonal to a magnetic flux generated by the first to fourth main windings; and
  first and second compensation windings for compensating for a magnetic flux distortion generated between the same poles of the first to fourth main windings during a two-pole operation.
3. The pole-change type motor of claim 2, wherein the first and second compensation windings are connected between the adjacent windings of the same polarity among the first to fourth main windings during the two-pole operation.
4. The pole-change type motor of claim 2, wherein the first and second compensation windings are disconnected from the first to fourth main windings during a four-pole operation.
5. The pole-change type motor of claim 2, wherein the first and second compensation windings compensate for a magnetic flux distortion generated in the first to fourth main windings.
6. The pole-change type motor of claim 1, wherein the third relay section switches over to the first and second compensation windings during the two-pole operation.
7. The pole-change type motor of claim 1, wherein the third relay section switches over to the first to fourth auxiliary windings during the four-pole operation.
8. The pole-change type motor of claim 1, wherein the fourth relay section is turned on for a predetermined time during the four-pole operation according to the switching operation of the third relay section.
9. The pole-change type motor of claim 1, the start torque according to the switching operation of the fourth relay section is controlled by changing wiring of a capacitor connected to the first auxiliary winding during the four-pole operation.
10. The pole-change type motor of claim 1, wherein the wiring of first to fourth main windings is changed to form four poles through the second relay section during a standard operation of the rotor.
11. The pole-change type motor of claim 1, wherein wiring of first to fourth main windings is changed to form two poles through a second relay section during a quick operation of the rotor.
12. The pole-change type motor of claim 1, wherein during the high-speed operation of the rotor, the rotor initially operates by four poles during a predetermined number of rotations, and with the lapse of the predetermined number of rotations, the rotor operates by two poles through the pole change.
13. A pole-change type motor comprising:
  a rotor;
  a stator including first to fourth main windings for generating a torque of the rotor by two poles or four poles, first to fourth auxiliary windings for smoothly effecting generation of a start torque and a rotative torque through an interaction by supplying a magnetic flux orthogonal to a magnetic flux generated by the first to fourth main windings, and first and second compensation windings for compensating for a magnetic flux distortion generated between the same poles of the first to fourth main windings during a two-pole operation; and
  a relay section for changing a polarity of the first to fourth main windings from the two poles to the four poles and vice versa, and switching a connection state of the first and second compensation windings.
14. A pole-change type motor comprising:
  a rotor;
  a stator including first to fourth main windings for generating a torque of the rotor by two poles or four poles, first to fourth auxiliary windings for smoothly effecting generation of a start torque and a rotative torque through an interaction by supplying a magnetic flux orthogonal to a magnetic flux generated by the first to fourth main windings, and first and second compensation windings for compensating for a magnetic flux distortion generated between the same poles of the first to fourth main windings during a two-pole operation; and a relay section including a first relay section for switching to control an on/off operation of the motor, a second relay section for controlling to change a polarity of the stator from a two-pole type to a four-pole type and vice versa by changing wiring of the first to fourth main windings, a third relay section for controlling to apply a power to the first and second compensation windings during the two-pole operation and to apply the power to the first to fourth auxiliary windings during the four-pole operation, and a fourth relay section for controlling a connection of a capacitor to increase the start torque of an initial operation for a predetermined time during the four-pole operation.

15. A pole-change type motor comprising:

a rotor;

a stator for generating rotor torque so as to perform a high-speed or low-speed motor operation depending on a selected number of poles; and a relay section for selecting the number of stator poles according to a load on the motor, wherein the relay section comprises:

a first relay for controlling an on/off operation of the motor;

a second relay for selecting the number of the stator poles by changing wiring of the main windings according to the load of the motor; and a third relay for selecting the number of the stator poles by selectively changing wiring of the auxiliary windings and the compensation windings according to the load of the motor.

16. The pole-change type motor of claim 15, wherein the stator comprises:

a plurality of main windings for generating the rotor torque depending on the selected number of stator poles;

a plurality of auxiliary windings for supplying a magnetic flux orthogonal to a magnetic flux generated by the main windings; and a plurality of compensation windings for compensating for a magnetic flux distortion generated between same poles of the main windings.

17. The pole-change type motor of claim 15, wherein the third relay switches over to the compensation windings if two stator poles are selected.

18. The pole-change type motor of claim 15, wherein the third relay switches over the auxiliary windings if four stator poles are selected.

19. The pole-change type motor of claim 15, further comprising a fourth relay between the third relay and the auxiliary windings.

20. A pole-change type motor comprising:

a rotor;

a stator including a plurality of main windings for generating rotor torque depending on a number of stator poles, a plurality of auxiliary windings for supplying a magnetic flux orthogonal to a magnetic flux generated by the main windings, and a plurality of compensation windings for compensating for a magnetic flux distortion generated between same poles of the main windings; and a relay section changing wiring of the main windings and alternatively switching to the auxiliary windings and the compensation windings.

21. The pole-change type motor of claim 20, wherein the relay section changes the wiring of the main windings and alternatively switches to the auxiliary windings and the compensation windings according to a load on the motor.

22. The pole-change type motor of claim 20, wherein the relay section connects the main windings with the compensation windings in parallel or in series according to a torque intensity generated by the stator.

23. The pole-change type motor of claim 20, wherein the relay section comprises:

a first relay for controlling an on/off operation of the motor;

a second relay for changing wiring of the main windings; and a third relay for alternatively switching to the auxiliary windings and the compensation windings.

24. The pole-change type motor of claim 20, wherein the relay section switches over to the compensation windings during a two-pole operation.

25. The pole-change type motor of claim 20, wherein the relay section switches over to the auxiliary windings during a four-pole operation.

* * * * *